Feb. 24, 1970   J. E. STAATS ET AL   3,497,656
ELECTRONIC RANGE

Filed Sept. 5, 1967   6 Sheets-Sheet 1

INVENTOR
JAMES E. STAATS
BY
Prangley, Baird, Clayton,
Miller & Vogel
ATTYS.

United States Patent Office 3,497,656
Patented Feb. 24, 1970

3,497,656
ELECTRONIC RANGE
James E. Staats, Louisville, Ky., assignor to General Electric Company, a corporation of New York
Filed Sept. 5, 1967, Ser. No. 665,346
Int. Cl. H05b 9/06
U.S. Cl. 219—10.55        20 Claims

ABSTRACT OF THE DISCLOSURE

There is disclosed an electronic cooking range comprising a metal casing, a box-like metal liner disposed in the upper portion of the casing and defining a cooking cavity, temperature insulating structure surrounding the outer walls of the liner and cooperating with the casing to define a rear apparatus compartment, a drawer disposed in the casing below the liner and spaced from the insulating structure and extending across the casing and cooperating therewith to define a bottom apparatus compartment, a resistive heating element disposed within the liner, a UHF generator in the bottom apparatus compartment, and a transmission line interconnecting the generator and the cooking cavity.

---

The present invention is directed to an electronic heating apparatus, and particularly a household range incorporating therein both heat cleaning facility and an electronic heating system and power supply therefor.

It is an important object of the invention to provide an electronic heating apparatus, and specifically a household electronic range, comprising an upstanding box-like metal casing, a box-like metal liner disposed in the upper portion of the casing and defining a cooking cavity and cooperating with the casing to define a rear apparatus compartment behind the liner, a drawer mounted in the casing below the liner and spaced therefrom and extending across the casing and cooperating therewith to define a bottom apparatus compartment below the drawer, a generator disposed in the bottom apparatus compartment for supplying ultra-high frequency electromagnetic wave energy, and a transmission line interconnecting the generator and the cooking cavity and extending through the bottom apparatus compartment and the rear apparatus compartment.

In connection with the foregoing object, it is another object of the invention to provide an electronic heating apparatus of the type set forth that also includes a metal housing surrounding the generator and grounded to the metal casing to prevent inadvertent application of high operating potentials from the generator to the drawer, the generator being disposed toward the rear of the casing, and the transmission line being coupled to the cooking cavity through the rear wall of the liner adjacent to the top thereof and substantially midway between the side walls thereof.

Another object of the invention is to provide an electronic heating apparatus of the type set forth wherein there is provided in the bottom apparatus compartment means for forcing a stream of air into the casing and through the bottom apparatus compartment and across the generator and out of the casing to effect cooling of the generator, and baffle structure shielding the liner from the stream of air to facilitate the maintenance of a more even temperature distribution in the cooking cavity.

Another object of the invention is to provide an electronic heating apparatus of the type set forth wherein insulating structure is disposed in the casing and surrounding the outer walls of the liner to provide temperature insulation therefor, a resistive heating element disposed within the liner for heating the liner and material disposed within the cooking cavity to temperatures within the normal cooking range to carry out cooking therein and also to temperatures well above the normal cooking range to carry out heat cleaning of the interior of the liner, a generator disposed in the bottom apparatus compartment and a transmission line interconnecting the generator and the cooking cavity, whereby to provide ultra-high frequency electromagnetic wave energy to the cooking cavity to carry out high frequency cooking therein.

Another object of the invention is to provide an electronic heating apparatus of the type set forth wherein the generator includes a cross-field discharge device having an annular outer output terminal and an inner output terminal both arranged with the longitudinal axes thereof disposed substantially horizontally and extending toward the rear of the casing, thereby to provide a generator having a very small vertical extent, and thus to accommodate a drawer in the casing below the liner and above the generator.

Another object of the invention is to provide an electronic heating apparatus of the type set forth wherein the generator and the power supply therefor are all enclosed in a metal housing disposed in the bottom apparatus compartment and being readily detachable and removable therefrom, the housing preferably being removable through an access panel provided in the rear of the casing.

A still further object of the invention is to provide in an electronic heating apparatus an improved generator for supplying ultra-high frequency electromagnetic wave energy to the electronic heating apparatus, the generator comprising a first metal housing readily mounted in and detachable from the associated electronic heating apparatus, a second metal housing mounted on the first metal housing and electrically insulated therefrom, a cross-field electron discharge device mounted in the second housing, and a voltage doubler and rectifier circuit for the device mounted in the first housing and electrically insulated therefrom.

Further features of the invention pertain to the particular arrangement of the elements of the electronic heating apparatus, whereby the above-outlined and additional operating features thereof are attained.

The invention, both as to its organization and method of operation, together with further objects and advantages thereof, will best be understood by reference to the following specification, taken in connection with the accompanying drawings, in which:

Referring now to FIGS. 1 to 4, inclusive, of the drawings, there is illustrated a household combination electric and electronic range 10 embodying the features of the present invention. More particularly, the range 10 comprises an upstanding substantially box-like metal casing 11 carrying a substantially horizontal metal cooking top 12 and an upstanding metal backsplash 13 arranged at the rear of the cooking top 12. The casing 11 also includes a front wall 14, a rear wall 15, a pair of side walls 16, and a bottom wall or base 17. The rear wall 15 has a large rectangular opening centrally thereof which is provided with a cover or rear panel 18 that is normally held in covering relationship by means of a plurality of screws 19.

Figures 1, 2:
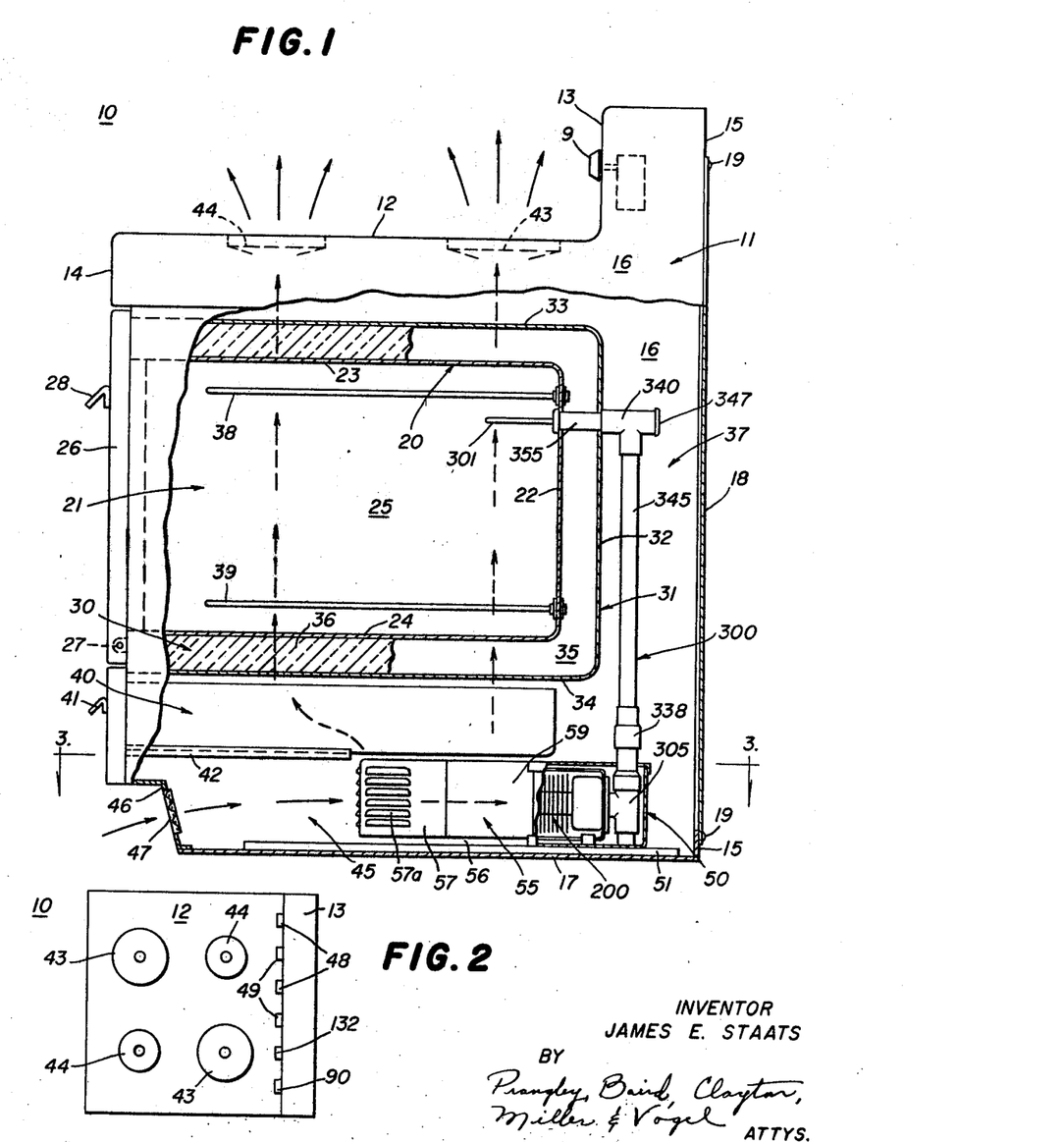
FIG. 1 is a side elevational view, partly broken away and partly in section, of a household combination electric and electronic range embodying the present invention.
FIG. 2 is a plan view on a reduced scale of the top of the range of FIG. 1.

A substantially box-shaped metal liner 20 is housed within the upper portion of the casing 11, which liner 20 defines an oven cooking cavity 21 therein. The liner 20 also comprises a rear wall 22, a top wall 23, a bottom wall 24 and a pair of side walls 45. The interior surfaces of the liner 20 may be finished in any conventional manner such, for example, as by carrying a layer of porcelain enamel of the glass frit type, not shown. A front opening is provided in the front wall 14 and an aligned front opening is provided in the liner 20, whereby the interior of the oven cooking cavity 21 is accessible from the front of the body 11 through the two front openings mentioned. In the arrangement, the front opening provided in the front wall 14 surrounds the two front openings mentioned. In the arrangement, the front opening provided in the front wall 14 surrounds the front opening provided in the liner 20, and heat insulating breaker structure is provided therebetween (not shown), the construction of which is fully disclosed in U.S. Letters Patent No. 3,121,158, granted Feb. 11, 1964 to B. Hurko for Household Cooking Ovens and Methods of Cleaning the Same. The front opening provided in the front wall 14 is closed by a front door 26 that is mounted upon the front of the casing 11 by hinge structure 27 and is movable about the lower edge thereof between a substantially horizontal open position and a substantially vertical closed position with respect to the open front of the oven cavity 21, a handle 28 being provided to facilitate such movement of the front door 26. When the front door 26 occupies its closed position as shown in FIG. 1, the top edge thereof is disposed below the front of the cooking top 12 and the outer surface thereof is in alignment with the outer surface of the front wall 14 so that the parts are arranged in vertical alignment or flush condition so as to lend a finished appearance to the front of the range 10. It is noted that the front door 26 in its closed position with respect to the casing 11 substantially completely seals the front opening into the oven cavity 21 about the entire periphery thereof, except for a narrow control air passage formed adjacent to the bottom thereof.

Disposed about the liner 20 is an insulating structure 30 which serves to insulate the liner 20 from the other parts and compartments also housed within the casing 11 of the range 10. As illustrated, the insulating structure 30 includes a box-like metal body 31 including a rear wall 32, a top wall 33, a bottom wall 34, and a pair of spaced apart side walls 35. Batts of insulation 36, which may be for example batts of glass fibers, are disposed between the liner 20 and the body 31 substantially completely therearound so as to provide for good insulation around all sides of the liner 20 except the front opening therein which is closed by the front door 26. It will be noted that the bottom wall 34 of the body 31 is spaced away from the bottom wall 17 of the casing 11, so as to provide space for additional equipment therebelow. The rear wall 32 of the body 31 is also spaced forwardly with respect to the rear wall 15 of the casing 11 and defines therebetween a rear machinery compartment.

Mounted directly below the body 31 is a drawer 40, the drawer 40 being slidably supported upon a pair of drawer supports 42 mounted respectively on the inner surfaces of the side walls 16 of the casing 11, the drawer supports 42 serving to support the drawer 40 in the position illustrated and to accommodate movement between a storage position illustrated in FIG. 1 and an extended position wherein a major portion of the drawer is disposed outside of the casing 11, a handle 41 being provided on the front of the drawer 40 to facilitate the movement of the drawer 40 between the storage position illustrated and the extended positions thereof. The bottom of the drawer 40 is spaced above and away from the bottom wall 17 of the casing 11 and defines therewith a bottom machinery compartment 45 that extends the full width of the casing 11 and extends the full distance front-to-rear of the casing 11 for accommodating mounting therein of a high-frequency power generator 50.

An upper or broil electric heating unit 38 is removably arranged in the upper portion of the oven cavity 21 adjacent to the liner top wall 23; and a lower or bake electric heating unit 39 is removably arranged in the lower portion of the oven cavity 21 adjacent to the liner bottom wall 24.

The cooking top 12 has four openings therein, in which a corresponding number of surface heating units are removably arranged, two larger surface heating units 43 being provided in the cooking top 12 and two smaller surface heating units 44 also being provided in the cooking top 12, see FIG. 2. The two larger surface heating units 43 are provided respectively with controls 48 and the two smaller surface heating units 44 are provided respectively with controls 49, the controls 48 and 49 being of conventional construction and arrangement and being mounted upon the backsplash 13.

In accordance with one important feature of the present invention, the range 10 having the liner 20 and the associated structure for carrying out both a heat cleaning of the interior surfaces of the liner 20 and an electronic cooking operation therein, has the drawer 40 disposed therebelow and also has further disposed below the drawer 40 the high frequency generator 50. The high frequency generator 50 constitutes a single unit mounted upon a V-shaped support 51 disposed on the casing bottom wall 17 and movable inwardly and outwardly thereon and with respect thereto, through the rear of the casing 11, and more particularly through the opening provided by the removal of the panel 18. The generator 50 includes a housing 55 within which are disposed an ultra-high frequency generator of the crossed-field electron discharge device and the power supply therefor, whereby the entire power supply to provide electronic cooking energy to the cooking cavity 25 is disposed within the generator housing 55. The generator housing 55 more specifically includes a base 56 upon which is mounted a right-hand guard 57 (see FIGS. 3 to 7, inclusive) and a left-hand guard 58, the top of the housing being closed by a cover 59. In order to facilitate the passage of cooling air through the housing 55, the right-hand guard 57 has a plurality of louvers 57a therein and the left-hand guard 58 also has a plurality of louvers 58a therein.

Figure 3:
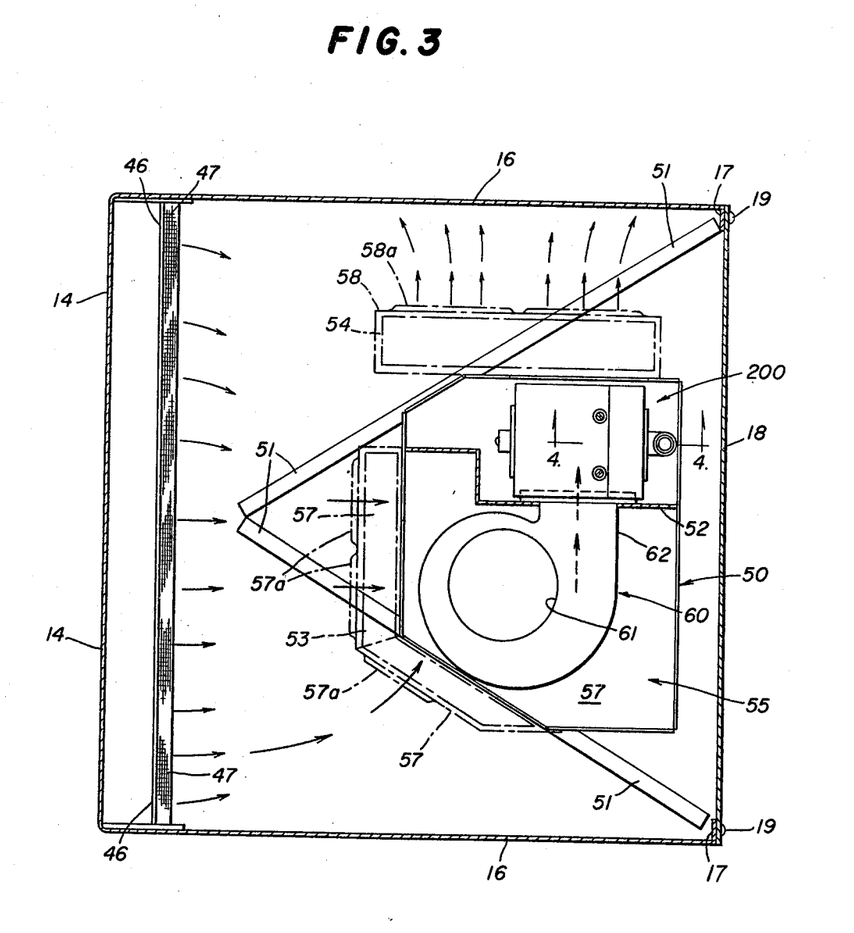
FIG. 3 is a view in horizontal section along the line 3—3 of FIG. 1.
Figure 5:
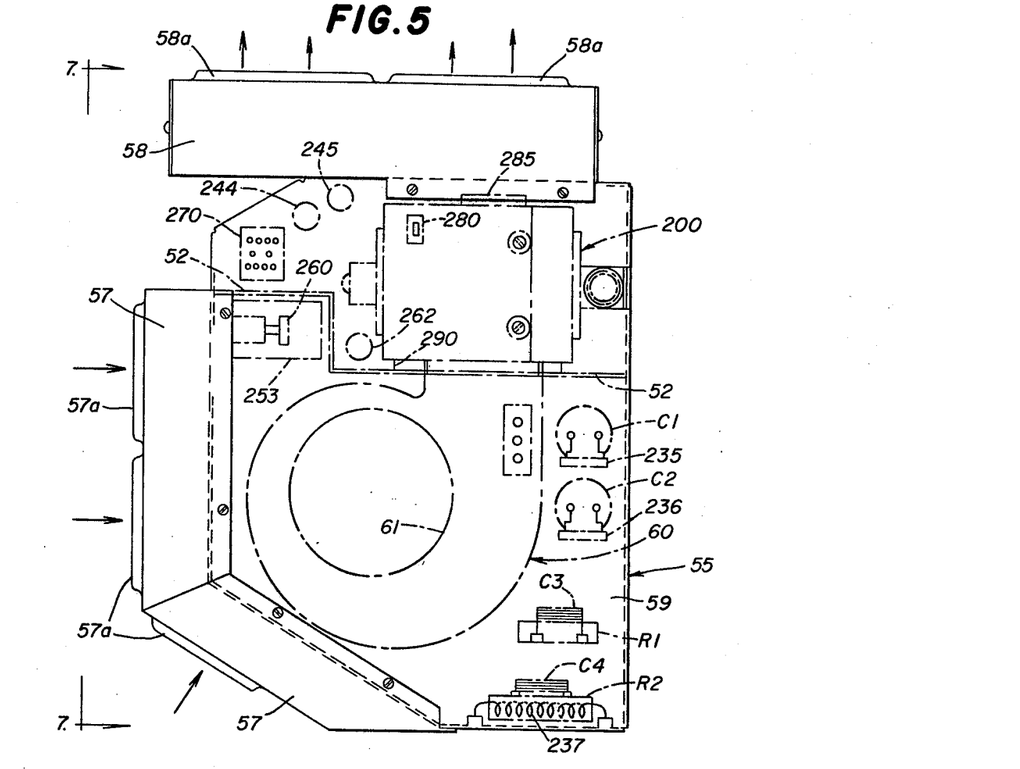
FIG. 5 is an enlarged plan view of the generator of FIG. 3 and further illustrating in dashed lines the position of certain of the electrical components thereof.
Figure 6:
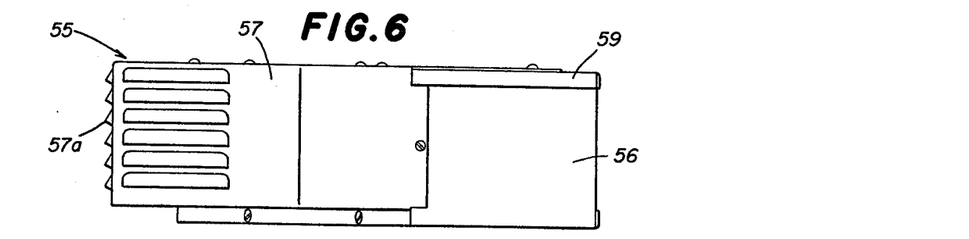
FIG. 6 is a side elevational view of that side of the housing of FIG. 5 disposed toward the bottom.
Figure 7:
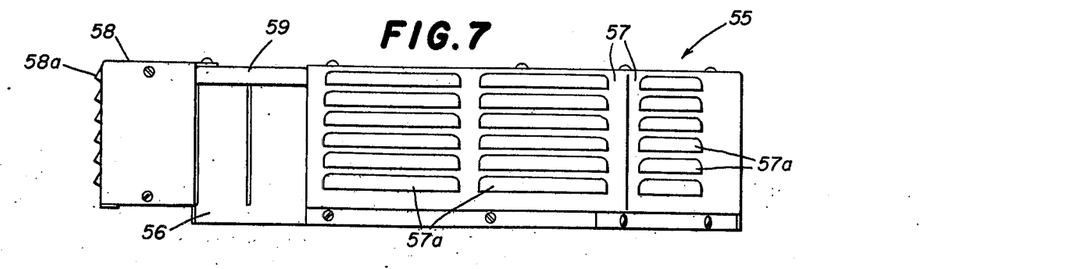
FIG. 7 is a side elevational view of the housing of FIG. 5 as seen in the direction of the arrows along the line 7—7 therein.

The generator housing 55 is divided into two separate compartments by means of a partition 52 extending thereacross (see FIGS. 3 and 5), the first compartment being disposed toward the bottom in FIGS. 3 and 5 and the second compartment being disposed toward the top in FIGS. 3 and 5. Disposed in the first compartment is a blower 60 which is of the centrifugal type that receives air through an opening 61 generally centrally thereof and blows the air through an outlet duct 62 which passes through the partition 52 to blow air into the second compartment and across a crossed-field electron discharge device 200 mounted therein. The blower 60 more fundamentally draws air from the exterior of the casing 11 through a screen 47 and into the machinery compartment 45 and then through the louvers 57a in the righthand guard 57, the air thus drawn into the housing 55 passing through the opening 61 and being compressed by the blower 60 and then discharged through the duct 62 and across the electron discharge device 200 and then outwardly through the lefthand guard 58 and specifically through the louvers 58a therein. It will be understood that the guards 57 and 58 may contain filters 53 and 54, respectively which serve to filter the stream of air produced by the blower 60. After leaving the guard 58, the air passes upwardly and around the sides of the insulating structure 30 and exits outwardly through one or more of the surface units 43 and 44 (see FIG. 1 also). The stream of air thus created serves not only to cool the components within the housing 55 but also serves to cool the insulating structure 30, this being particularly desirable during the heat cleaning of the inner surfaces of the liner 20.

Figure 4:
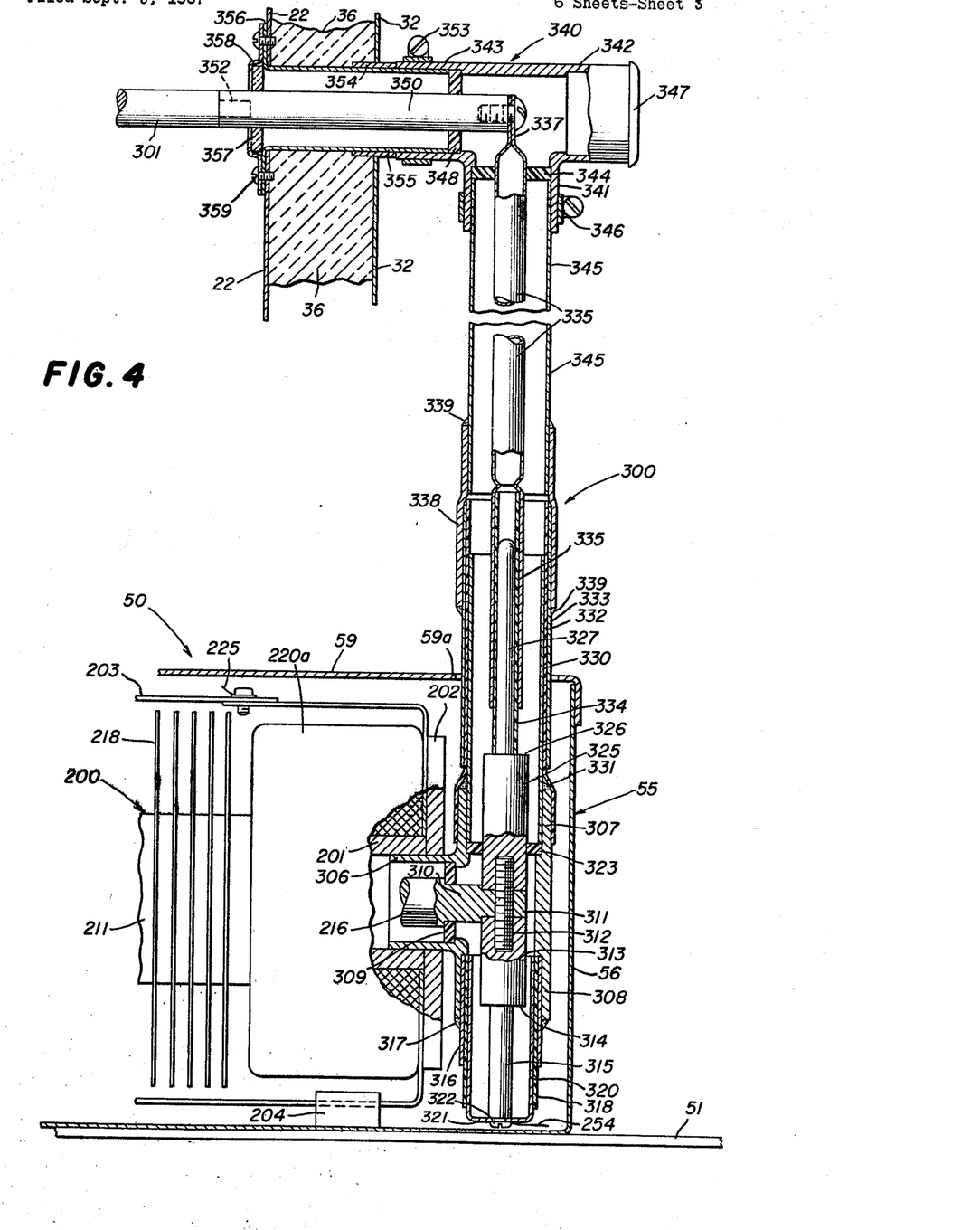
FIG. 4 is an enlarged fragmentary view in vertical section with, certain portions broken away, of the generator and transmission line of FIG. 3 as seen along the lines 4—4 thereof.

Referring particularly to FIGS. 3 and 4, it will be seen that the electron discharge device 200 includes an anode wall 211 on which are disposed a large number of radially extending cooling fins 218. Disposed about the opposite ends of the anode wall 211 are field coil sections, the field coil section 220a being illustrated in FIG. 4, the flux from the field coils being conveyed by pole pieces 201 of magnetic iron or steel to the interaction space of the device 200, the opposite pole pieces 201 being provided with outwardly extending flanges 202 of magnetic material that are in turn connected by a magnetic inner housing 203 that provides a return path for the magnetic field between the magnetic pole pieces 201 and the associated magnetic flanges 202. The device 200 is mounted within the generator housing 55 on a plurality of insulators 204 which provide galvanic insulation and RF insulation between the generator housing 55 and the inner housing 203. It is pointed out, however, that the housing 203 is open on one pair of opposed sides thereof so that cooling air can pass therethrough and across the cooling fins 218.

The RF output from the electron discharge device 200 appears to the right in FIG. 4 and specifically between the pole piece 201 serving as an outer annular conductor electrically connected to the anode of the device 200 and a cylindrical connector 216 that is electrically connected to the cathode of the device 200. The RF output appearing between the members 201 and 216 is conveyed by a coaxial microwave conductor or transmission line 300 to an antenna 301 disposed in the oven liner 21. The details of construction of the transmission line 300 are best seen in FIG. 4 wherein it will be seen that a first T 305 is provided adjacent to the device 200 and has a leg 306 telescopically received in the opening in the adjacent pole piece 201 and a pair of arms 307 and 308. The leg 306 has mounted therein an insulator 309 having an opening centrally therein receiving therethrough a reduced portion 310 on the end of the connector 216, the reduced portion 310 extending into the T 305 and having a further flattened and apertured portion 311 receiving therethrough a threaded stud 312. The axis of the stud 312 is arranged essentially vertically and the lower end of the stud 312 threadedly receives thereon an inner conductor 313 having a shoulder 314 and a reduced portion 315 thereon, the reduced portion 315 extending beyond the end of the T arm 308 and being arranged essentially concentrically with respect thereto. Telescopically received within the arm 308 is an annular outer conductor 316 which is fixedly secured to the T 308 as by soldering at 317, the outer conductor 316 extending beyond the arm 308 and substantially to the outer edge of the magnetic flange 202. Disposed within the outer conductor 316 is an insulating sleeve 318 formed of a suitable synthetic organic resin, such as a polytetrafluoroethylene resin sold under the trademark "Teflon," the sleeve 318 further receiving therein a cylindrical cup 320 having an outer closure wall 321 provided with an opening therein through which extends a screw 322 engaging a threaded opening in the conductor 315 fixedly to mount the cup 320 with respect to the conductor 315. The length of the cup 320 is equivalent to a quarter wavelength of the fundamental frequency of operation of the device 200 and serves as a filter to prevent propagation of the output of the device 200 and the second harmonic thereof to the screw 322 which also serves to connect the B− potential and a heater potential to the device 200, all as will be explained more fully hereinafter. The shoulder 314 also provides a matching impedance that assists in matching the generator to the impedance of the cooking load in the cooking cavity 25. It will be appreciated therefore that both a tuning and filtering characteristic are provided by the cup 320 and the associated parts.

The other end of the stud 312 carries an inner conductor 325 threadedly secured thereto and having disposed therearound an annular insulator 323 mounted in the arm 307, the conductor 325 extending outwardly beyond the ends of the arm 307 and having thereon a shoulder 326 and an outwardly extending probe 327. Telescopically arranged within the arm 307 is an outer annular conductor 330, the conductor 330 being secured to the arm 307 as by soldering at 331, whereby fixedly to secure the outer conductor 330 in an upstanding vertical position extending through an opening 59a provided in the cover 59 of the housing 55. Surrounding the outer conductor 330 is an insulating sleeve 332 formed of the same material as the insulating sleeve 318 and surrounding the insulating sleeve 332 is an outer conductor 333 that is telescopically associated with the outer conductor 330. The telescoping conductors 330 and 333 and the intervening sleeve 332 form a capacitive connection or coupling in the transmission line 300, this capacitive coupling being designated by the numeral 221 in FIG. 9.

Figure 9:
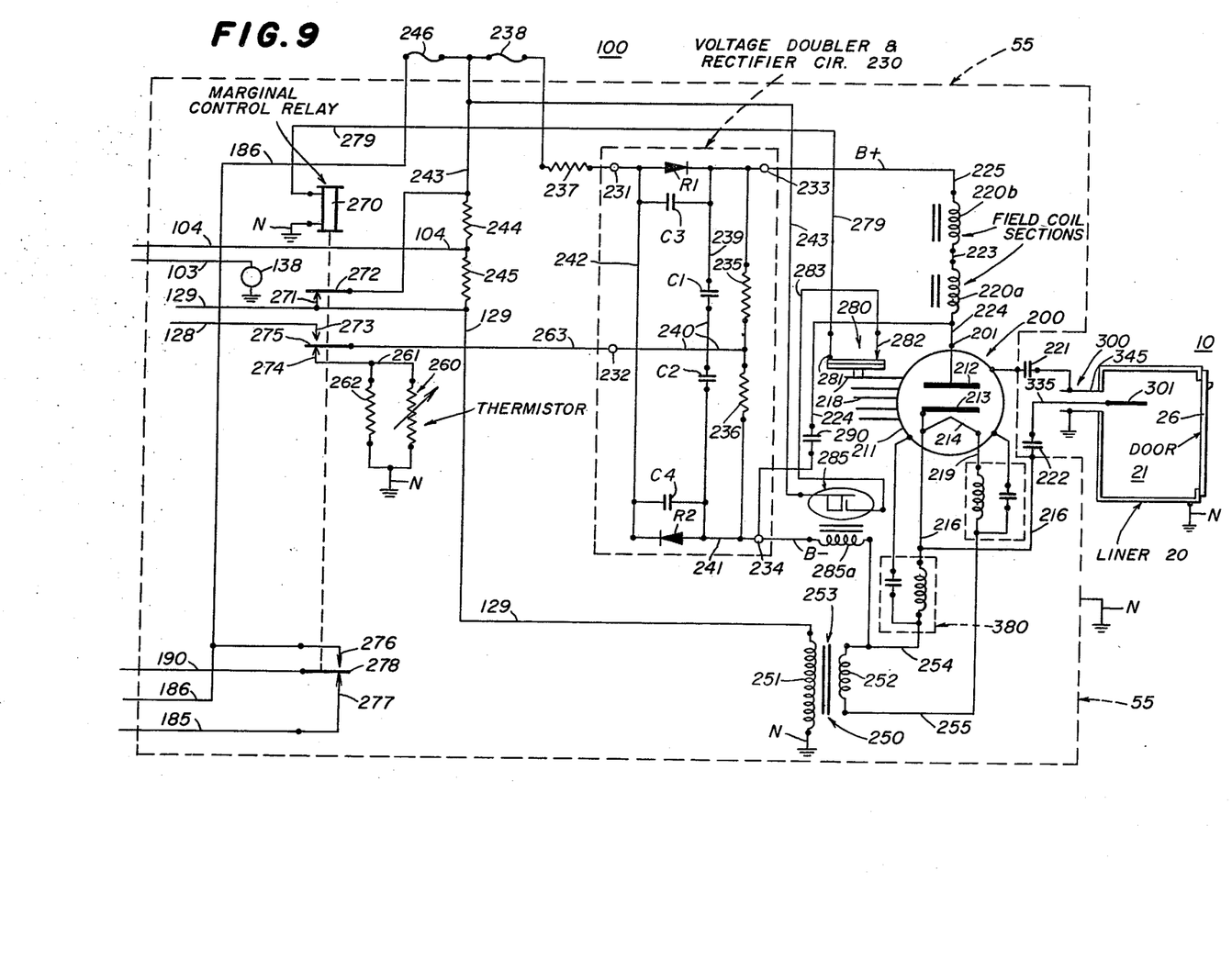
FIG. 9 is a schematic and diagrammatic view of that portion of the power supply for the range of FIGS. 1 to 7 that is fundamentally disposed within the generator housing in the bottom thereof.

The probe 327 has an insulating sleeve 334 disposed therearound in telescoping relation and extending upwardly thereabove and receiving therearound an annular inner conductor 335, the probe 327, the conductor 335 and the sleeve 334 cooperating to form a capacitive coupling in the inner conductor of the transmission line 300, this capacitive coupling being designated by the numeral 222 in FIG. 9. As illustrated, the annular inner conductor 335 extends upwardly beyond the end of the probe 327 and has a necked portion 336 therein and extends upwardly into a second T 340 and has a flattened upper end 337. The outer conductor 333 has a metallic sleeve 338 telescopically therearound, the upper end of the sleeve 338 receiving the lower end of an outer conductor 345, the conductors 333 and 345 being secured to the sleeve 338 as by soldering at 399.

The T 340 has a lower leg or arm 341 and a pair of laterally directed arms 342 and 343, the outer conductor 345 being telescopically received in the leg 341 and being secured thereto by means of a clamp 346. An insulator 344 is also provided in the leg 341 and has an opening centrally thereof that receives therethrough the upper end of the inner conductor 335. The outer end of the arm 342 is closed by a dust cap 347 and the other arm 343 has an insulator 348 therein that receives therethrough an inner conductor 350 in the form of a solid rod. One end of the rod 350 abuts against the flattened end 337 of the inner conductor 335 and receives a screw 351 fixedly to interconnect the inner conductors 335 and 350. The outer end of the conductor 350 has a threaded opening therein receiving a threaded stud 352 on the end of the antenna 301, thereby to mount the antenna 301 thereon. The arm 343 further has telescopically received therein an outer conductor 355 held in position by a clamp 353 disposed around the arm 343, the outer conductor 355 extending through a short sleeve 354 fixedly secured to the wall 32. The forward end (disposed to the left in FIG. 4) of the outer conductor 355 extends through an opening in the liner rear wall 22 and has an outwardly flared flange 356 thereon lying against the inner side of the liner wall 22. An insulator 357 surrounds the conductor 350 and is held in place by a bracket 358, a plurality of screws 359 passing through aligned openings in the bracket 358 and the flange 356 and being threadedly received in the liner wall 22.

Figure 8:
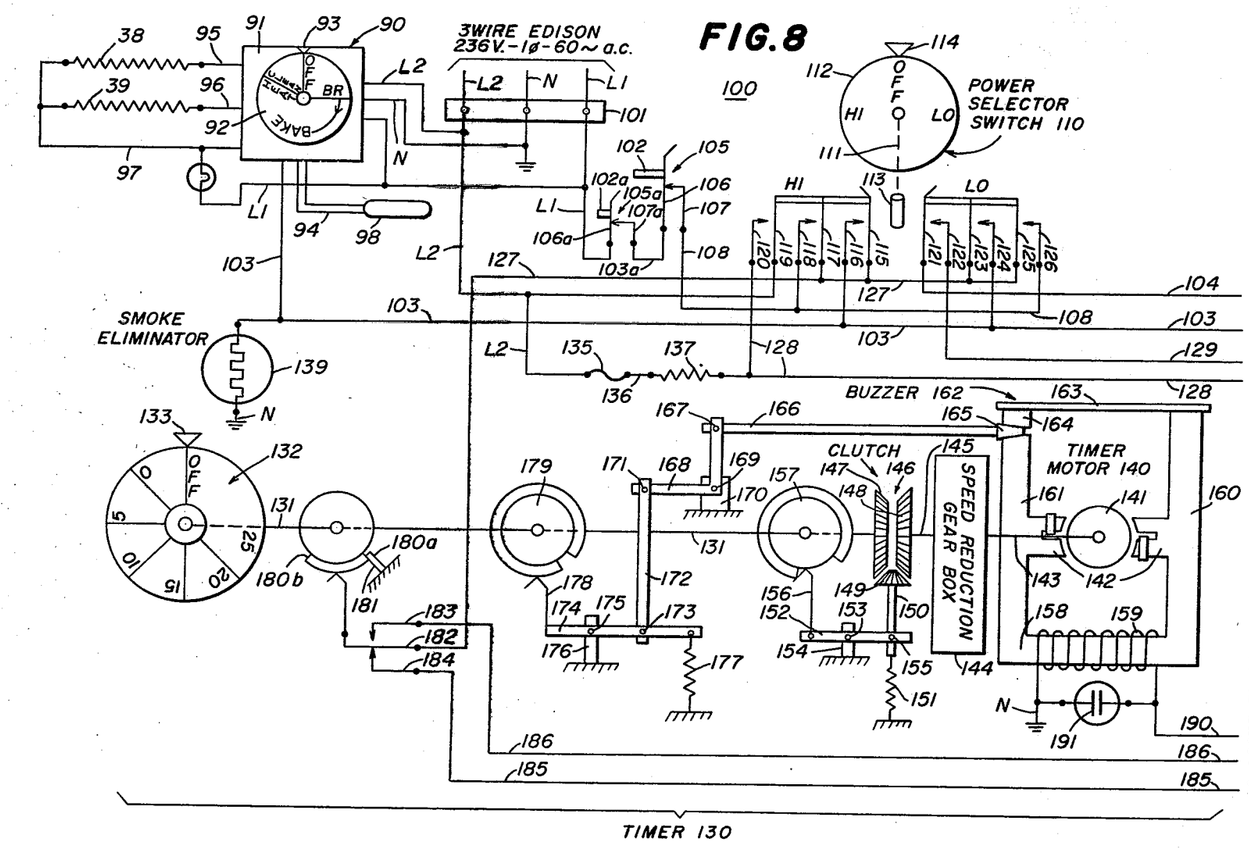
FIG. 8 is a schematic and diagrammatic illustration of that portion of the power supply for the range of FIGS. 1 to 7, inclusive, that is disposed and housed outside of the housing disposed in the bottom thereof.

Referring to FIGS. 8 and 9, there is illustrated the control and power supply system 100 for the range 10, the system being of the fundamental connection and arrangement of that disclosed in the copending application of James E. Staats, Ser. No. 569,006 filed July 27, 1966 (now abandoned in favor of continuation application, Ser. No. 676,584, filed Oct. 19, 1967) and incorporating a low-voltage crossed-field electron discharge device 200 of the construction and arrangement of that disclosed in the copending application of James E. Staats, Ser. No. 559,267, filed June 21, 1966. Specifically, the device 200 comprises the substantially cylindrical metal envelope or anode wall 211, structure 212 enclosed in the envelope 211 and constituting an anode, structure 213 enclosed in the envelope 211 and constituting a cathode, a heater 214 enclosed in the envelope 211 and operatively associated with the cathode 213, an output terminal 201 connected to the envelope 211, an output terminal 216 directly connected to the cathode 213, an input terminal 217 directly connected to the anode 212 and extending out of the envelope 211 and an input terminal in the form of the terminal 216 directly connected to the cathode 213 and extending out of the envelope 211, the terminal 216 being both an input terminal and an output terminal for the device 200.

The device 200 is operative to supply ultra-high frequency of about 915 mc., with a power output at the output terminals 201–216 in the general range 50 to 800 watts, the power output being supplied to the range 10, and specifically to the interior of the liner 20 thereof. Since both of the output terminals 201 and 216 have a substantial voltage D.C. with respect to ground potential, the output terminals 201 and 216 are electrically insulated from ground potential and are coupled to the output transmission line conductors 335–345 through the capacitive connectors 221 and 222 respectively, described above. As a consequence, the outer conductor 345 can be grounded on the walls 22 and 32 as illustrated, the conductor 345 and the liner 20 being grounded as at N. Thus the RF energy produced by operation of the device 200 is radiated from the antenna 301 into the cooking cavity 25, so as to produce electronic cooking effects upon food arranged therein, all in a conventional manner. In the device 200, one terminal of the heater 214 is electrically connected to the output terminal 216, and the other terminal of the heater 214 is electrically connected to a conductor 219 that projects out of the envelope 211. Further, the device 200 comprises a composite field winding including two sections 220a and 220b connected in series by a conductor 223. The input terminal 201 that is connected to the anode 212 of the device 200 is connected to the conductor 224 of the field winding section 220a and the free terminal of the field winding section 220b is connected to a conductor 225.

Also, the control and power supply system 100 comprises an insulating block 101 terminating a source of power supply of the 3-wire Edison type and including a neutral line N that is electrically connected to ground potential, and a pair of side lines L1 and L2 that are electrically insulated from each other and from the neutral line N. Operatively associated with the front door 26 of the range 10 is latching mechanism indicated at 102, which latching mechanism 102 is selectively operative into latch and unlatch positions with respect to the liner 20, when the front door 26 is moved between its closed and open positions. Associated with the latching mechanism 102 is a door latch switch 105 that includes a pair of switch springs 106 and 107. In the arrangement, the door latch switch 105 is selectively operated between closed and open positions in response to the operation of the latching mechanism 102 into its respective latch and unlatch positions. Specifically, operation of the latching mechanism 102 into its latch position operates the door latch 105 into its closed position, moving the switch sprng 106 to engage the swtch spring 107. A second latching mechanism 102a is associated with the rear panel 18, the latching mechanism 102a being identical to the latching mechanism 102, whereby like reference numerals have the suffix a thereon as applied to like parts. The two switches are arranged in series, whereby the switch spring 106a terminates the line conductor L1 and the switch spring 107 terminates a conductor 108.

Further, the system comprises an oven switch and temperature controller 90 of conventional construction and arrangement and including a casing 91 carrying a manually operable dial 92 cooperating with an associated index marker 93. The dial 92 comprises an "off" position, a variable 'bake" position corresponding to an operating temperature range a "broil" position, and a "heat clean" position corresponding to a heat cleaning temperature range. The casing 91 houses a power switch, not shown, that is selectively operated by the dial 92 into corresponding "off," "bake," "broil" and "heat clean" positions. Also, the casing 91 houses a temperature control device, not shown, that is selectively set by the dial 92 and that is selectively operative by a temperature sensing bulb 98 through an associated capillary tube 94. Further, the controller 90 comprises three input terminals to which the line conductors L1 and L2 and the neutral conductor N are respectively conected, as well as three output terminals to which three conductors 95, 96 and 97 are respectively connected. The two terminals of the upper heating unit 38 are respectively conected to the conductors 95 and 97 and the two terminals of the lower heating unit 39 are selectively connected to the conductors 96 and 97.

A power selector switch 110 is incorporated in the control and power supply system; which selector switch 110 comprises a rotatable operating shaft 111, a manual dial 112 operatively connected to the outer end of the shaft 111 and an insulator 113 operatively connected to the inner end of the shaft 111. The power selector switch 110 has off, high and low positions; whereby the dial 112 carries corresponding legends "OFF," "HI" and "LO"; and which legends cooperate with an associated stationary marker 114. Also, the power selector switch 110 comprises a set of high power switch springs 115, 116, 117, 118, 119 and 120, and a set of low power switch springs 121, 122, 123, 124, 125 and 126; which sets of switch springs are selectively operated by the cooperating insulator 113. Specifically: when the dial 112 occupies its "OFF" position, the pairs of switch springs 115, 116 and 117, 118 and 119, 120 are disengaged, and the pairs of switch springs 121, 122 and 123, 124 and 125, 126 are disengaged. When the dial 112 is rotated into its "HI" position, the insulator 113 actuates the switch springs 115 and 117 and 119 to engage the switch springs 116 and 118 and 120, respectively. When the dial 112 is rotated into its "LO" position, the insulator 113 actuates the switch springs 121 and 123 and 125 to engage the switch springs 122 and 124 and 126, respectively. In the arrangement, the switch springs 115 and 117 and 123 and 125 commonly terminate a conductor 127, the switch springs 116 and 124 commonly terminate a conductor 103, the switch springs 118 and 126 commonly terminate the conductor 108, the switch spring 119 terminates the line conductor L2, the switch spring 120 terminates a conductor 128, the switch spring 121 terminates a conductor 104 and the switch spring 122 terminates a conductor 129.

Further, the circuit network comprises a timer 130 which includes a rotatably mounted operating shaft 131 carrying a manually operable dial 132 on the outer end thereof; which dial 132 carries the indices "OFF" and the numerical indices "0," "5," "10," etc., and "25"; which indices cooperate with a stationary index marker 133. Also, the timer 130 comprises a timer motor 140 of the synchronous or clock type, including a rotor 141 and a cooperating pair of pole pieces 142, the rotor 141 being rigidly secured to a rotatably mounted operating shaft 143. The operating shaft 143 is operatively connected to a speed reduction gear box, indicated at 144; which gear box 144 is provided with an output shaft 145. The operating shaft 131 and the output shaft 145 are arranged in longitudinal axial alignment with each other and are selectively interconnected by clutch mechanism 146 including two longitudinally spaced-apart gears 147 and 148 rigidly connected to the adjacent ends of the shafts 131 and 145, respectively, as well as a pinion 149 carried by a vertically movable stub shaft 150; which pinion 149 is adapted to engage the two gears 147 and 148 when the clutch mechanism 146 occupies its clutch position; and which pinion 149 is adapted to disengage the two gears 147 and 148 when the clutch mechanism 146 occupies its declutch position. The stub shaft 150 is biased by a cooperating coil spring 151 into a declutch position, so as to move the pinion 149 vertically into its declutch position disengaging the gears 147 and 148. The stub shaft 150 is moved vertically against the bias of the coil spring 151 into a clutch position, so as to move the pinion 149 vertically into its clutch position engaging the gears 147 and 148, by a cooperating lever 152; which lever 152 is pivotally mounted at the intermediate portion thereof, as indicated at 153, upon a stationary support 154; and which lever 152 is pivotally connected at one end thereof as indicated at 155 to the stub shaft 150. The other end of the lever 152 carries a follower 156 which rides a cooperating cam 157 rigidly secured to the operating shaft 131.

The timer motor 140 further comprises magnetic yoke structure including an arm 158 carrying a winding 159. The opposite ends of the arm 158 are respectively connected to two legs 160 and 161 that respectively carry the two pole pieces 142 that are operatively associated with the rotor 141. The leg 160 projects beyond the adjacent pole piece 142 and carries at the outer end thereof a buzzer 162 that includes a metal spring 163 formed of magnetic material, one end of the spring 163 being rigidly secured to the adjacent end of the leg 160, and the free end of the spring 163 carrying an armature 164 disposed in cooperating spaced-apart relation with the adjacent end of the leg 161. Also, the buzzer 162 includes a wedge 165 formed of magnetic material and arranged in cooperating relation between the armature 164 and the adjacent end of the leg 161; which wedge 165 is carried upon the outer end of a rod 166 mounted for longitudinal movements substantially parallel to the operating shaft 143. The inner end of the rod 166 is pivotally connected as indicated at 167, to one arm of a bell crank 168 that is pivotally supported, as indicated at 169, upon an external support 170. Another arm of the bell crank 168 is pivotally connected as indicated at 171, to one end of a rod 172; and the other end of the rod 172 is pivotally connected, as indicated at 173, to the intermediate portion of a lever 174. Another intermediate portion of a lever 174 is pivotally connected, as indicated at 175, to an external support 176. One end of the lever 174 is biased into a given position by a cooperating coil spring 177; and the other end of the lever 174 carries a follower 178 that rides a cooperating cam 179 rigidly secured to the operating shaft 131.

Also, the operating shaft 131 carries an insulating cam 180 rigidly affixed thereto; which cam 180 cooperates with an external stop 181. Moreover, the cam 180 cooperates with a follower switch spring 182 riding the same; which switch spring 182 cooperates with two other switch springs 183 and 184. In the arrangement, the switch springs 182, 183 and 184, respectively, terminate the conductor 127, a conductor 186 and a conductor 185.

When the dial 132 occupies its "OFF" position; one shoulder 180a of the cam 180 engages the limit stop 181; the cam 180 actuates the switch spring 182 to disengage the switch spring 183 and to engage the switch spring 184; the cam 179 actuates the follower 178, so as to rotate the lever 174 in the counter-clockwise direction about the pivot 175, as shown in FIG. 1, so that the rod 172 actuates the bell crank 168 in order to actuate the rod 166 for the purpose of projecting the wedge 165 into a keeping position and between the armature 164 and the adjacent end of the leg 161; and the cam 157 actuates the follower 156, so as to release the lever 152 in order to allow the coil spring 151 to rotate the lever 152 in a clockwise direction about the pivot 153, as shown in FIG. 1, so that the stub shaft 150 moves downwardly to move the pinion 149 into its declutch position to disengage the two gears 147 and 148 for the purpose of declutching the shaft 145 from the operating shaft 131.

When the dial 132 occupies its "0" position; the one shoulder 180a of the cam 180 disengages the limit stop 181; the cam 180 actuates the switch spring 182 to disengage the switch spring 183 and to engage the switch spring 184; the cam 179 actuates the follower 178, so as to release the lever 174 in order to allow the coil spring 177 to rotate the lever 174 in the clockwise direction about the pivot 175, as shown in FIG. 1, so that the rod 172 actuates the bell crank 168 in order to actuate the rod 166 for the purpose of withdrawing the wedge 185 into a releasing position and from between the armature 164 and the adjacent end of the leg 161; and the cam 157 actuates the follower 156, so as to release the lever 152 in order to allow the coil spring 151 to rotate the lever 152 in the clockwise direction about the pivot 153, as shown in FIG. 1, so that the stub shaft 150 moves downwardly to move the pinion 149 into its declutch position disengaging the two gears 147 and 148 for the purpose of declutching the shaft 145 from the operating shaft 131.

When the dial 132 occupies any of its numerical positions "1", "5", "10", etc.; the one shoulder 180a of the cam 180 disengages the limit stop 181; the cam 180 actuates the switch spring 182 to engage the switch spring 183 and to disengage the switch spring 184; the cam 179 actuates the follower 178, so as to rotate the lever 174 in the counter-clockwise direction about the pivot 175, as shown in FIG. 1, so that the rod 172 actuates the bell crank 168 in order to actuate the rod 166 for the purpose of projecting the wedge 165 into its keeping position and between the armature 164 and the adjacent end of the leg 161; and the cam 157 actuates the follower 156, so as to rotate the lever 152 in the counter-clockwise direction about the pivot 153, as shown in FIG. 1, so that the stub shaft 150 moves upwardly to move the pinion 149 into its clutch position engaging the two gears 147 and 148 for the purpose of clutching the shaft 145 to the operating shaft 131.

The winding 159 of the timer motor 140 is connected across the neutral line N and a conductor 190; and a pilot lamp 191 of the neon type is bridged across the winding 159 and between the neutral conductor N and the conductor 190. When the conductor 190 is connected to the line L1, via a circuit traced hereinafter, the winding 159 is energized in an obvious manner, and the pilot lamp 191 glows to indicate the energization of the winding 159. Energization of the winding 159 causes rotation of the rotor 141 in a known manner; and it may be assumed that the same is rotated at a synchonous speed of 3600 r.p.m. Also, it may be assumed that the gear box 144 causes rotation of the shaft 145 at a speed of 1 revolution per 40 minutes, as indicated by the constructional example of the dial 132, so that the dial 132 is rotated ½ revolution per 20 minutes in accordance with the legends "0',, and "20" carried thereby. Specifically, rotation of the shaft 143 at 3600 r.p.m. causes the gear box 144 to drive the shaft 145 at a speed of 1 revolution per 40 minutes; which rotation of the shaft 145 is transmitted to the operating shaft 131 only when the clutch 146 is operated into its clutch position causing rotation of the operating shaft 131 in the counterclockwise direction, as viewed in FIG. 1, and at the speed of 1 revolution per 40 minutes; and which rotation of the shaft 145 is not transmitted to the operating shaft 131 when the clutch 146 is operated into its declutched position. Also, energization of the winding 159 causes magnetic "leakage" of flux via the path between the legs 160 and 161 including the spring 163, the armature 164 and the wedge 165. When the wedge 165 occupies its projected position between the armature 164 and the adjacent end of the leg 161, the armature 164 is restrained against chatter, so that no substantial audible noise is produced and the buzzer 162 may be considered to be "turned off." On the other hand, when the wedge 165 occupies its withdrawn position from between the armature 164 and the adjacent end of the leg 161, the armature 164 is released to chatter, so that the same vibrates into alternate engagement and disengagement with the wedge 165, in order to produce an audible noise and the buzzer 162 may be considered to be "turned on."

In the timer 130, rotation of the dial 132 into its "25" minute position causes the other shoulder 180b to engage the limit stop 181, so as to prevent clockwise rotation thereof beyond its "25" minute position mentioned. In passing, it is noted that any suitable angle less than 360° of rotation may be provided between the two shoulers 180a and 180b; and this angle may correspond to any desired maximum setable time interval depending upon the gear box 144. Thus, the "25" minute position of maximum setable time interval is of no significance and is only illustrated by way of an example.

Recapitulating, with reference to the operation of the timer 130: the same is manually rotated by the cook out of its "OFF" position in the clockwise direction, and through its "0" position, into some desired numerical position, such, for example, as the "20" minute position, so as to present a corresponding cooking time interval of 20 minutes. As explained more fully hereinafter, this setting of the dial 132 into its "20" minute position causes the start sequence of the electronic auxilliaries; subsequently, and upon initiation of operation of the preset cooking cycle in the oven cavity 21, operation of the timer 140 is initiated, with the result that the shaft 145 is rotated to effect rotation of the operating shaft 131 through the clutch 146 in its clutch position and in the counter-clockwise direction at the speed of 1 revolution per 40 minutes (½ revolution per 20 minutes). Thus, at the expiration of 20 minutes of cooking time interval, the dial 132 is rotated into its "0" position; whereby the cam 180 operates the switch springs 182 to 184 to bring about terminatiton of the cooking cycle in the oven cavity 21. Also, the cam 157 causes operation of the clutch 146 into its declutch position, so that further operation of the timer motor 140 does not disturb the "0" position of the dial 132. Further, the cam 179 causes operation of the wedge 165, so that the buzzer 162 is operated from its "turn-off" position into its "turn-on" position to produce an audible noise indicating to the cook the termination of the preset cooking time interval.

The cook receiving the audible signal noted, then manually rotates the dial 132 in the counter-clockwise direction from its "0" position back into its "OFF" position; whereby the timer 179 causes operation of the wedge 165, so that the buzzer 162 is operated from its "turn-on" position back into its "turn-off" position to arrest the audible noise produced thereby.

Further considering the circuit network, the crossed-field discharge device 200 is supplied with D.C. power from an associated voltage doubler and rectifier circuit or unit 230 that comprises a pair of input terminals 231, 232 and a pair of output terminals 233, 234, as well as a pair of capacitors C1 and C2, that are preferably of the electrolytic type, and a pair of rectifying diodes R1 and R2, that are preferably of the silicon-crystal type. Also, the circuit 230 comprises a pair of bleeder or stabilizing resistors 235 and 236 connected in series with each other and across the output terminals 233, 234, and a surge limiting resistor 237 and a current protective device in the form of a thermal fuse 238. One terminal of the capacitor C1 is connected by a conductor 239 to the output terminal 233; the other terminal of the capacitor C1 is connected by a conductor 240 to one terminal of the capacitor C2; and the other terminal of the capacitor C2 is connected by a conductor 241 to the output terminal 234. The input terminal 231 is connected by a conductor 242 to the positive pole of the diode or rectifier R1 and to the negative pole of the diode or rectifier R2; the negative pole of the rectifier R1 is connected to the conductor 239; and the positive pole of the rectifier R2 is connected to the conductor 241. The input terminal 231 is connected to one terminal of the surge resistor 237 and the other terminal of the surge resistor 237 is connected to one terminal of the fuse 238. The other terminal of the fuse 238 is connected to a conductor 243; a current protective device in the form of a thermal fuse 246 interconnects the conductors 186 and 243. The output terminal 233 is connected to a B+ conductor; the output terminal 234 is connected to a B− conductor. There also is provided in parallel with the rectifier R1, a capacitor C3 and in parallel with the rectifier R2 a capacitor C4, the capacitors C3 and C4 bypassing RF interference around the rectifiers R1 and R2, respectively.

The circuit network further comprises a transformer 250 provided with a primary winding 251 and a secondary winding 252, as well as a coupling magnetic core 253. One terminal of the primary winding 251 is connected to a conductor 129 that also is connected to one terminal of a resistor 245; the other terminal of the resistor 245 is connected by the conductor 104 to one terminal of a resistor 244; and the other terminal of the resistor 244 is connected to the conductor 243 to which is supplied the potential on the main conductor L1 when the circuit network is in its start position. The other terminal of the primary winding 251 is connected by the conductor N to ground potential. One terminal of the secondary winding 252 is connected to the B− potential (through a coil to be described later) by a conductor 254 and the other terminal of the secondary winding 252 is connected to a conductor 255. The B− conductor 254 is connected to the conductor 216 via a reactive impedance 256a and the conductor 255 is connected to the conductor 219 via a reactive impedance 256b. The conductor 254 is also connected to the envelope 211 of the device 200 via a capacitive impedance 257a and a conductor 258, and the conductor 255 is likewise connected to the envelope 211 of the device 200 via a capacitive impedance 257b and a conductor 259. By this connection, the B− potential is applied to the cathode 213 of the device 200 while the impedances 256a, 256b, 257a and 257b prevent the introduction of RF energy into the transformer 250.

Further, the circuit network comprises a thermistor 260, the thermistor 260 being a resistive element characterized by a high negative temperature coefficient of resistance, the thermistor 260 more specifically being of the self-heating type. One terminal of the thermistor 260 is connected to ground potential by the neutral conductor N and the other terminal is connected to a conductor 261. Disposed in parallel with the thermistor 260 is a resistor 262 having one terminal grounded by the neutral conductor N and having the other terminal connected to the conductor 261.

In the start condition of the voltage doubler and rectifier circuit 230, it is desired to connect the thermistor 260 and the resistor 262 to the input terminal 232 to which is connected a conductor 263, and to this end a marginal control relay 270 has been provided. One terminal of the control relay 270 is connected by the neutral conductor N to ground potential and the other terminal thereof is connected to a conductor 279. There is associated with the relay 270 a first pair of switch springs 271, 272 and a second set of switch springs 273, 274, 275 and a third set of switch springs 276, 277 and 278. The switch spring 271 terminates the conductor 129; the switch spring 272 terminates the conductor 243; the switch spring 273 terminates a conductor 128; the switch spring 274 terminates the conductor 261; the switch spring 275 terminates a conductor 263; the switch spring 276 terminates the conductor 186; the switch spring 277 terminates a conductor 175; and the switch spring 278 terminates a conductor 190. When the relay 270 is in the de-energized position illustrated in FIG. 2, the switch springs 271, 272 are closed, thus to interconnect the conductors 129 and 243 and as a consequence shorting out the resistors 244, 245. The switch springs 274, 275 are closed, thus interconnecting the conductors 261 and 263 to connect the thermistor 260 and the resistor 262 to the input terminal 232. The switch springs 277, 278 and closed and interconnect the conductors 185 and 190.

The control relay 270 is further connected by the conductor 279 in a circuit that includes a thermal protective device 280 and a magnetic switch 285. More specifically, the device 280 is in the form of a bimetallic member having one terminal 281 thereof connected to the conductor 279 and having a cooperating switch spring 282. The switch spring 282 is connected by a conductor 283 to one terminal of the magnetic switch 285 and the other terminal of the magnetic switch 285 is connected to the conductor 243. The device 280 is physically associated with one of the cooling fins 218 on the crossed-field discharge device 200, the bimetallic member of the device 280 being in contact with the switch spring 282 so long as the operating temperature of the device 200 is in a safe range, and the bimetallic member 280 moving away from the contact 282 when the temperature of the device 200, and specifically the cooling fin 218 thereof, rises above a predetermined value. The magnetic switch 285 further has associated therewith the coil 285a having one terminal thereof connected to the conductor 234 and having the other terminal thereof connected to the conductor 254; the switch 285 is of the type which is normally open and is closed when the magnetic field from the coil 285a associated therewith reaches a predetermined strength, after which the switch 285 closes, thereby to connect the conductors 243 and 283 therethrough.

The circuit network further includes a connection from the main conductor L2 to a thermal protective device in the form of a fuse 135, one terminal of the fuse 135 being connected to the conductor L2 and the other terminal of the fuse 135 being connected by a conductor 136 to one terminal of a resistor 137, the other terminal of the resistor 137 being connected to the conductor 128.

Finally, there is provided about the crossed-field discharge device 200 a bypass capacitor 290 having one terminal thereof connected to the conductor 224 and having the other terminal thereof connected to the terminal 234, whereby one terminal of the capacitor 290 is connected via the conductor 224 to the anode 212 of the device 200 and the other terminal of the capacitor 290 is connected by the terminal 234, the coil 285a, the conductor 254 and the conductor 216 to the cathode 213 of the device 200.

Considering the general mode of operation of the voltage doubler and rectifier circuit 230 in conjunction with the power selector switch 110, it is noted that when the power selector switch 110 occupies its "HI" position, the line conductor L1 is connected via the closed switch springs 106, 107, the conductor 108 and the closed switch springs 117, 118 to the conductor 127, and the line conductor L2 is connected via the switch springs 119, 120 to the conductor 128. On the other hand, when the power selector switch 110 occupies its "LO" position, the line conductor L2 is connected via the fuse 135 and the resistor 137 to the conductor 128. The conductor 127 upon actuation of the timer 130 is connected via the closed switch springs 182, 183 to the conductor 186 that is connected via the fuse 246, the fuse 238 and the surge resistor 237 to the input terminal 231 of the voltage doubler and rectifier circuit 230. At this time the other input terminal 232 is connected via the conductor 263, the closed switch springs 274, 275, the conductor 261, the thermistor 260 and the resistor 261 to the neutral conductor N that is grounded. Thus, when the power selector 110 occupies either its "HI" position or its "LO" position, 118 volts A.C. may be impressed between the input terminals 231 and 232 of the voltage doubler and rectifier circuit 230.

When the 118 volts A.C. voltage is applied across the input terminals 231 and 232, the various circuit components are in the "start condition" and/or "start position" thereof. More particularly, the thermistor 260 is cold, whereby to present a very high resistance, so that the resistance between the conductor 261 and ground is essentially the resistance of the resistor 262; the conductor 261 is connected in series with the input terminal 232 via the closed switch springs 274, 275 and the conductor 263. The switch springs 271, 272 are closed, whereby the resistors 244, 245 are shorted out, thereby to apply the full 118 volt A.C. potential across the primary winding 251 of the heater transformer 250. As a result, the maximum potential for the cathode heater 214 is applied thereto, whereby to begin heating of the cathode 213, and specifically, the electron emissive coating thereon. Due to the relatively high impedance imparted to the circuit by the resistor 262, a reduced output potential is provided between the output terminals 233 and 234 of the circuit 230, thereby to apply a reduced B+ potential across the device 200, and specifically between the anode 212 and the cathode 213 thereof; as a consequence, there will not be sufficient anode to cathode potential in the device 200 to destroy the cathode 213 by removing therefrom the emissive material prior to the heating thereof to the proper operating temperature.

As the cathode 213 heats, the device 200 bceomes conductive and a current flows therethrough and through the circuit 230; since the thermistor 260 is in series with at least a portion of the current flowing through the circuit 230 and the current flowing through the device 200, the thermistor heats and the resistance thereof decreases; as the resistance of the thermistor 260 decreases, the total resistance between the conductor 261 and ground decreases, and finally the resistance of the thermistor 260 is less than 1 ohm, whereby effectively to remove the impedance between the conductor 261 and ground potential from the circuit 230. As a result, the proportion of the potential within the rectifier circuit 230 appearing at the output terminals 233, 234 rises since substantially no part thereof appears across the resistance between the conductor 261 and ground potential. From the above it will be seen that the impedance between the conductor 261 and ground potential and therefore the impedance in the input to the rectifier circuit 230 continually decreases and in a manner proportional to the total conduction of energy through the device 200, the thermistor 260 and the resistor 262 being in series with at least a portion of the energy conducted through the device 200.

When the conduction of current through the device 200 rises to a predetermined value, the magnetic field about the coil 285a rises to the predetermined strength that causes actuation of the magnetic switch 285. Closure of the magnetic switch 285 completes a circuit for the control relay 270 as follows: from the neutral conductor N through the winding of the relay 270, and via the conductor 279, the bimetallic member 280, the switch spring 282, the conductor 283, the magnetic switch 285, the conductor 243 and the fuse 244 to the conductor 186 on which appears the 118 volt A.C. potential. Closure of the magnetic switch 285 accordingly energizes the control relay 270; actuation of the control relay 270 opens the switch springs 271, 272, thus to remove the short around the resistors 244, 245 in series with the primary winding 251 of the heater transformer 250; opens the switch springs 274, 275 and closes the switch springs 273, 274, thus to connect the potential on the conductor 128 to the input terminal 232 of the voltage doubler and rectifier circuit 230; and opens the switch springs 277, 278 and closes the switch springs 276, 278 to connect the conductor 186 to the conductor 190, thus to commence operation of the timer motor 140.

If the power selector switch 110 is in the "HI" position, a 236 volt A.C. potential is applied between the input terminals 231 and 232; more specifically, the main conductor L1 is connected via the closed switch springs 106, 107, the conductor 108, the closed switch springs 117, 118, the conductor 127, the closed switch springs 182, 183, the conductor 186, the fuse 246, the conductor 243, the fuse 238 and the surge resistor 237 to the input terminal 231 of the circuit 230; the main line conductor L2 is connected via the closed switch springs 119, 120, the conductor 128, the closed switch springs 273, 275, and the conductor 263 to the input terminal 232 of the circuit 230; as a consequence, the full 236 volt A.C. line potential is applied as an input to the voltage doubler and rectifier circuit 230. Also both the resistors 244 and 245 are connected in series with the primary winding 251 of the heater transformer 250, thereby materially to reduce the potential thereacross and to reduce the potential applied to the cathode heater 214 in the crossed-field device 200. Also, the switch springs 115, 116 are closed thus to apply operating potential to a conductor 103 that supplies operating potential for a blower motor 138 arranged to drive the blower 60 for cooling the device 200 and a smoke eliminator 139 forming a part of the range 10, the blower motor 138 having one terminal connected to the conductor 103 and the other terminal connected to the neutral conductor N, and the smoke eliminator 139 having one terminal 103 and the other terminal connected to the neutral conductor N.

On the other hand, if the power selector switch 110 is in the "LOW" position thereof, the input terminal 231 of the voltage doubler and rectifier circuit 230 is again connected to the main line conductor L1 while the input terminal 232 of the circuit 230 is connected to the main line conductor L2 through the dropping resistor 280; more specifically, a circuit can be traced from the line conductor L1 through the switch contacts 106, 107, the conductor 108, the closed switch springs 125, 126, the conductor 127, the closed switch springs 182, 183, the conductor 186, the fuse 246, the conductor 243, the fuse 238 and the surge resistor 237 to the input terminal 231; and a circuit can be traced from the line conductor L2 through the fuse 135, the conductor 136, the dropping resistor 137, the conductor 128, the closed switch springs 273, 275 and the conductor 263 to the other input terminal 232 of the circuit 230. The dropping resistor 137 decreases the applied potential to the voltage doubler and rectifier circuit 230, thereby to decrease the output D.C. voltage at the output terminals 233 and 234 thereof, thereby to decrease the potential applied to the crossed-field discharge device 200 and thus to lower the power output thereof. Also, the resistor 245 is shorted and thus to remove it from the input circuit for the primary winding 251 of the heater transformer 250. More specifically, the switch springs 121, 122 are closed thus to connect the conductor 104 to the conductor 129, thus to short out the resistor 245; as a consequence, a slightly increased power is provided for the heater 214 when the device 200 is operated at low power. When in low power operation, i.e., when the power selector switch is in the "LO" position, the switch springs 123, 124 are closed to apply operating potential to the conductor 103 so as to operate the blower motor 138 and the smoke eliminator 139.

Further details of the construction and operation of the control and power supply system 100 are set forth in the co-pending application Ser. No. 569,006 referred to above, and the description thereof is incorporated herein by reference.

It further is pointed out that the oven switch and temperature controller 90 is mounted on the backsplash 13 as is the power selector switch 110 and the manually operable dial 132. The other parts illustrated in FIG. 8 of the drawings are also fundamentally positioned in the area of the backsplash 13 except the smoke eliminator 139 which is beneath the rear surface unit 43, the heating elements 38 and 39 that are disposed within the liner 20 and the temperature sensing bulb 98 which is located within the oven cavity 21.

On the other hand, those elements enclosed within the dashed line in FIG. 9 of the drawings are enclosed within the housing 55, the housing 55 providing electrical shielding therearound as well as physical protection therefor; it being understood that all of the parts within the housing 55 are removable therewith from the casing 11.

Now considering the overall operation of the circuit network 100, it may be assumed that a cooking operation is to be carried out in the oven cavity 21 during any suitable time interval, such for example as 15 minutes, and that high power is required in the cooking operation. The cook places the food in the oven cavity 21 and latches closed the door 26, whereby the door latch mechanism 102 operates the door latch switch 105 to close the switch springs 106, 107. The cook may then rotate the dial 132 of the timer 130 out of its "OFF" position and into its "15" minute position, in the clockwise direction, as viewed in FIG. 1, whereby the timer 130 is conditioned for operation in the manner previously described. Now the cook may rotate the dial 112 of the power selector switch 110 into its "HI" position; whereby the line conductor L1 is connected via the closed switch springs 106, 107 and the conductor 108 and the closed switch springs 117, 118 to the conductor 127, and via the closed switch springs 182, 183 to the conductor 186; the potential on the conductor 186 is connected via the fuse 246, the conductor 243, the fuse 238 and the surge resistor 237 to the input terminal 231 of the voltage doubler and rectifier circuit 230. Also, the input terminals 232 of the voltage doubler and rectifier circuit 230 is connected via the conductor 263 and the closed switch springs 274, 275 and the conductor 261 and the thermistor 260 and the resistor 262 and the neutral conductor N to ground potential. Also, a connection is made from the potential on the conductor 243 derived from the main line conductor L1 via the closed switch springs 271, 272 and the conductor 129 to the primary winding 251 of the heater transformer 250, the other terminal of the primary winding 251 being grounded. As a result, the cathode 213 of the device 200 is heated via an obvious circuit, the heater 214 effecting the heating of the cathode 213, whereby the same is rendered electron emissive.

As the cathode 213 is heated, the emission thereof increases and the device 200 begins to conduct current. The thermistor 260 is cold at this time and has a relatively high impedance, whereby a relatively high impedance is inserted in the input of the voltage doubler and rectifier circuit 230, thereby to decrease the output potential between the output terminals 233 and 234 thereof. As the device 200 conducts, a portion of the energy therethrough passes through the thermistor 260, thereby to heat the thermistor 260 and to decrease the impedance thereof, the thermistor 260 ultimately having an impedance on the order of less than 1 ohm, whereby substantially to remove completely from the input of the circuit 230 the impedance between the conductor 261 and ground potential; as a result the maximum output potential is now derived at the output terminals 233, 234 of the circuit 230 and is applied across the device 200, thus progressively also to increase the current therethrough. Ultimately the cathode 213 reaches saturation, i.e., an increase of cathode temperature does not increase the electron emission thereof, whereby to provide the dwell in the current rise.

Shortly thereafter the device 200 begins to oscillate, and accordingly, the current therethrough further increases above the saturation value and eventually the rate of current flow produces a strength of magnetic field about the magnetic switch 285 to cause the same to close.

Closure of the magnetic switch 285 operates the control relay 270 and changes the switch springs from the start positions thereof illustrated in FIG. 2 to the run positions thereof. More specifically, the switch springs 274, 275 are opened, thereby to remove from the input of the circuit 230 the thermistor 260 and the resistor 262; the switch springs 273, 275 are closed thus to apply the high A.C. potential on the conductor 128 to the input terminal 232 of the voltage doubler and rectifier circuit 230, the potential between the input terminals 231 and 232 being 236 volts A.C.; the switch springs 271, 272 are opened, thereby to place the resistors 244 and 245 in series with the primary winding 251 of the heater transformer 250, thus materially to reduce the output therefrom and the energy supplied to the cathode heater 214.

With full output potential now applied from the voltage doubler and rectifier circuit 230, the current through the device 200 immediately rises and eventually reaches the steady state condition. Due to the prensence of the capacitor 290 across the device 200, the voltage transient represented by the switching from ground potential on the input terminal 232 of the voltage doubler and rectifier circuit 230 to the high potential on the conductor L2 is bypassed therearound; more specifically, the capacitor 290 bypasses the transient voltage surge around the device 200, thereby substantially to eliminate the single turn transformer action of the envelope thereof. As a result, there is a rapid build up of the current through the field coil sections 220a and 220b, thus to facilitate continued oscillation of the device 200. In this connection it is also pointed out that the surge resistor 237 protects the switch springs on the relay 270 when the operating potentials are first applied to the network.

Accordingly, at the beginning of the start cycle of the device 200, maximum impedance in the form of the thermistor 260 and the resistor 262 is present in the input circuit for the voltage doubler and rectifier circuit 230, thereby to provide a minimum starting potential at the output terminals 233 and 234 thereof, only 118 volts A.C. being applied as an input thereto; also, maximum heating power is supplied to the heater 214 from the transformer 250. A portion of the energy through the device 200 also passes through the thermistor 260 so that the thermistor 260 is heated proportional to the total energy conducted through the device 200. As the conduction of energy through the device 200 proceeds, the thermistor 260 is heated and the impedance thereof decreases so as to decrease the impedance in the input to the voltage doubler and rectifier circuit 230 and thus to raise the output potential at the output terminals 233, 234 thereof. Ultimately, and after the conduction of a predetermined amount of energy through the device 200, the impedance of the thermistor 260 falls to less than 1 ohm, whereby substantially to remove the impedance from the input to the voltage doubler and rectifier circuit 230 and thus to provide the full D.C. output potential at the output terminals 233, 234. After the device 200 begins to oscillate, a sufficient magnetic field is provided by the field coil sections 220a and 220b to close the magnetic switch 285, after which the impedance represented by the thermistor 260 and the resistor 262 is switched out of the input to the voltage doubler and rectifier circuit 230 and the full potential from the conductors L1, L2 is applied as the input to the voltage doubler and rectifier circuit 230, provided that the power selector switch 110 is in the "HI" position thereof. Also, an impedance in the form of the resistors 244 and 245 is switched into series circuit with the primary winding 251 of the heater transformer 250, thus materially to reduce the energy supplied to heat the cathode 213 of the device 200. It will be understood that the circuit including the thermistor 260 automatically compensates for a low line voltage applied to the input terminals 231, 232 of the voltage doubler and rectifier circuit 230 since it will require a longer period of time to heat the cathode 213 and to conduct a predetermined amount of energy through the device 200, thus to insure that the cathode 213 is in condition for high power operation before the high potential is applied thereto. In any event, a relatively low D.C. potential is initially applied to the device 200 when the cathode 213 is cold, and the applied D.C. potential gradually rises to approximately half of the high power value, whereby the device 200 begins operating at a low applied potential; only after the device 200 is oscillating is the full high power B+ potential applied thereto from the output terminals 233, 234 of the voltage doubler and rectifier circuit 230, the application of the high B+ potential being in response to the creation of a magnetic field of predetermined strength about the field coils 220a and 220b, which predetermined strength is achieved only after the device 200 is oscillating.

The bypass capacitor 290 facilitates the switching from low power operation to high power operation of the device 200, the transient rise in potential being bypassed around the device 200 and thus quickly building the current through the field coil sections 220a and 220b, thus to insure that the transient voltage-current-magnetic field relationship is such as to favor oscillation in the desired pi mode rather than some other undesired mode, these conditions determining the maximum loading via the cooking cavity 21 of the device 200 for starting at the pi mode. In this regard the capacitor 290 should have a transient impedance equal to or less than that of the device 200 so as to have the desired transient bypass effect.

Reverting to the operation of the control relay 270, the same opens the switch springs 277, 278 and closes the switch springs 276, 278. Closure of the switch springs 276, 278 connects the conductor 186 to the conductor 190, so as to energize the winding 159 of the timer motor 140 of the timer 130 and to illuminate the lamp 191 to indicate this circumstance. Thus, the timer motor 140 rotates its rotor 141, without operating the buzzer 162, so that the engaged clutch 146 brings about the restoration of the operating shaft 131 into its "0" position upon the expiration of 15 minutes following operation of the control relay 270, which operation of the control relay 270 was simultaneous with the application of high operating potential to the voltage doubler and rectifier circuit 230 and to the crossed-field discharge device 200.

When the dial 132 of the timer 130 is thus returned into its "0" position by operation of the timer motor 140, as described above, the cam 157 governs the follower 156 to actuate the clutch 146 into its declutch position, as previously described, so that subsequent operation of the timer motor 140 does not disturb the operating shaft 131 in its "0" position. Also, the cam 179 governs the follower 178 so as to withdraw the wedge 165 from between the armature 164 and the adjacent end of the leg 161, so as to cut-on the buzzer 162, with the result that the chatter of the armature 164 produces an audible noise indicating to the cook the expiration of the preset time interval.

Further, the cam 180 in the "0" position of the operating shaft 131 opens the switch springs 182, 183 and closes the switch springs 182, 184. Opening of the switch springs 182, 183 removes potential from the conductor 186, with the result that operating potential is removed from the input terminal 231 of the voltage doubler and rectifier circuit 230 and the relay 270 restores, thereby arresting positively operation of the voltage doubler and rectifier circuit 230, so that oscillation of the crossed-field discharge device 200 is arrested to terminate the supply of RF power to the oven cavity 21 and to end the cooking operation in the oven cavity 21.

Closing of the switch springs 182, 184 completes an alternative circuit for energizing the winding 159 of the timer motor 140; this alternative circuit including the elements: L1, 106, 107, 108, 117, 118, 127, 182, 184, 185, 277, 278, 190, and N; whereby operation of the buzzer 162 is continued, not withstanding the restoration of the relay 270.

When the cook subsequently manually returns the dial 132 from its "0" position into its "OFF" position, the cam 179 gives the follower 178, so as to effect insertion of the wedge 165 between the armature 164 and the adjacent end of the leg 161, thereby to "cut off" the buzzer 162, although the winding 159 of the timer motor 140 is still energized.

In order completely to de-energize the winding 159, the cook may restore the power selector switch 110 into its "OFF" position, so as to open the switch springs 117, 118 in order to disconnect the potential from the conductor 127; whereby the winding 159 is de-energized, and the pilot lamp 191 is extinguished to indicate this circumstance.

Operation of the circuit network to supply low power to the crossed-field device 200 is fundamentally the same as the operation thereof to supply high power to the device 200, and is produced as a consequence of the setting of the power selector switch 110 into its "LO" position. In this case, the operation proceeds as previously described until the control relay 270 operates; only the resistor 244 is inserted in series with the primary winding 251 of the heater transformer 250, the resistor 245 being shorted out by closure of the switch springs 121, 122 thereby to interconnect the conductors 104 and 129 and thus to short out the resistor 245; opening of the switch springs 271, 272 upon operation of the control relay 270 therefore places only the resistor 244 in series with the primary winding 251. Likewise, in the "LO" position of the power selector switch 110, the main conductor L2 is connected through the fuse 135 and the dropping resistor 288 to the conductor 128 rather than being connected directly to the conductor 128 as is the case when the power selector 110 is in the "HI" position thereof, whereby the potential on the conductor L2 is dropped across the resistor 288 before being applied to the input terminal 232 of the voltage doubler and rectifier circuit 230 via the closed switch springs 273, 275 and the conductor 263. As a consequence, the voltage doubler and rectifier circuit 230 operates to produce low D.C. power, so as to cause the crossed-field discharge device 200 to supply low RF power to the oven cavity 202 for the cooking purposes.

During the operation of the circuit network, and without reference to the position of the power selector switch 110, should the cook unlatch the front door 26 to obtain access to the oven cavity 21, the latching mechanism 102 actuates the door latch switch 105 into its open position, so that the line conductor L1 is disconnected from the conductor 108 in order to arrest operation of the voltage doubler and rectifier circuit 230 and to cause the restoration of the control relay 270. Moreover, the disconnection of potential from the conductor 108 effects de-energization of the winding 159 of the primary motor 140 and arrests operation of the buzzer 162 in the event that it is operating at the time when the latch mechanism 102 is thus operated to release the front door 26 from movement out of its closed position.

Having carried out a cooking operation within the oven cavity 21, which cooking operation may be of either the normal electric type, the cook may desire to clean the interior surfaces of the liner 20 by a heat-cleaning operation. In order to carry out a heat-cleaning operation in the oven cavity 21, the cook sets the dial 92 of the oven switch and temperature controller 90 into its "heat-clean" position, which position corresponds to a temperature in the oven cavity of approximately 880° F. It will be noted that there also is a connection from the line conductor 103 to the oven switch 90 so that operating potential is applied to the conductor 103 when the oven switch 90 is placed in the "heat-clean" position thereof. As a consequence, the smoke eliminator 139 and the motor 138 driving the blower 60 both operate during the "heat-clean" cycle. The "heat-clean" cycle proceeds in the usual manner, a more full description thereof being set forth in Patent No. 3,121,158 referred to above.

In a typical illustrative example of the ultra-high frequency control and power supply system 100, the bleeder and stabilizing resistors 235 and 236 each has a resistance of 10,000 ohms; the surge limiting resistor 237 has a resistance of 1 ohm; the capacitors C1 and C2 each has a capacitance of 500 microfarads; the capacitors C3 and C4 each has a capacitance of 0.05 microfarad; the thermistor 260 has a resistance in the cold condition of approximately 400 ohms and a resistance in the hot condition of less than 1 ohm; the resistor 262 has a resistance of 20 ohms; the dropping resistor 135 has a resistance of 20 ohms; and the bypass capacitor 290 has a capacitance of 60 microfarads and is preferably of electrolytic type.

An important feature of the invention resides in providing the storage drawer 40 below the insulating structure 30 and further providing the generator 50 below the drawer 40, all while maintaining the cooking top 12 at the standard height of approximately 36 inches, and while maintaining the standard depth from front to back of approximately 25 inches. It will be understood that the depth from front to back and the height of the cooking surface 12 above the floor are fundamentally set by the standard design of kitchen counter constructions, whereby these dimensions cannot be altered in a range such as the range 10. All of this is accomplished while providing the extra heavy insulating structure 30 that is required when the range 10 is of the so-called "heat-clean" type. This is all possible due to the fact that the generator 50 is of such small vertical dimensions, the vertical dimension thereof being on the order of no more than about 5 inches, whereby the generator 50 can readily fit below the storage drawer 40 that is in turn disposed directly below the oven cavity 21 and the insulating structure 30 disposed thereabout. The cook greatly values the provision of the storage drawer 40 in the range 10, whereby the described arrangement is highly advantageous.

Another important feature of the present invention resides in the fact that the major components for providing the required ultra-high frequency electromagnetic wave energy for electronic cooking are housed within the generator housing 55, the housing 55 in turn being mounted upon the supports 51 for ready assembly thereonto and removal therefrom through the rear access panel 18. Such ready removal of the power supply in the form of the generator 50 is achieved by first removing the clamp 346 (see FIG. 4), removing the screws 359, and removing the dust cap 347 and the screw 351. The outer conductor 355 can then be removed by pushing on the insulator 348 so that the upper portion of the transmission line can be pulled upwardly to disassociate the T 340 from the outer conductor 345. The transmission line 335–345 can then be moved outwardly through the rear panel 18 with the generator housing 55, thus quickly and readily to disassemble all of these parts from the casing 11.

From the above it will be seen that there has been provided an electron heating apparatus, and specifically a household type cooking range which is of the combination electric and electronic type and incorporating therein the heat-cleaning feature, which apparatus fulfills all of the objects and advantages set forth above.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electronic heating apparatus comprising an upstanding box-like metal casing, a box-like metal liner disposed in the upper portion of said casing and defining a cooking cavity and cooperating with said casing to define a rear apparatus compartment behind said liner, a drawer mounted in said casing below said liner and spaced therefrom and extending across said casing, a bottom apparatus compartment disposed below said drawer, a generator disposed in said bottom apparatus compartment for supplying ultra-high frequency electromagnetic wave energy, and a transmission line interconnecting said generator and said cooking cavity and extending through said bottom apparatus compartment and said rear apparatus compartment, said drawer being interposed between said liner and said generator and providing a thermal shield therebetween.

2. The electronic heating apparatus set forth in claim 1, and further comprising a metal housing surrounding said generator and grounded to said metal casing to prevent inadvertent application of high operating potentials from said generator to said drawer.

3. The electronic heating apparatus set forth in claim 1, wherein said generator is disposed toward the rear of said casing, and said transmission line is coupled to said cooking cavity through the rear wall of said liner adjacent to the top thereof and substantially midway between the side walls thereof.

4. An electronic heating apparatus comprising an upstanding box-like metal casing, a box-like metal liner disposed in the upper portion of said casing and defining a cooking cavity and cooperating with said casing to define a rear apparatus compartment behind said liner, a drawer mounted in said casing below said liner and spaced therefrom and extending across said casing, a bottom apparatus compartment disposed below said drawer, a generator disposed in said bottom apparatus compartment for supplying ultra-high frequency electromagnetic wave energy, a transmission line interconnecting said generator and said cooking cavity and extending through said bottom apparatus compartment and said rear apparatus compartment, said drawer being interposed between said liner and said generator and providing a thermal shield therebetween, means for forcing a stream of air into said casing and through said bottom apparatus compartment and across said generator and out of said casing to effect cooling of said generator, and baffle structure shielding said liner from the stream of air to facilitate the maintenance of a more nearly uniform temperature distribution in said cooking cavity.

5. The electronic heating apparatus set forth in claim 4, wherein said means for forcing a stream of air into said casing includes a reticulated metal member in the lower portion of said casing below said drawer on one side of said generator for admitting a stream of air therethrough, an opening in said casing on the other side of said generator for passing a stream of air therethrough, and a fan mounted between said reticulated member and said opening for drawing a stream of air through said reticulated member and passing the stream of air over said generator and discharging the stream of air through said opening.

6. The electronic heating apparatus set forth in claim 4, wherein said transmission line includes a top section coupled to said cooking cavity and a bottom section coupled to said generator and a rear section interconnecting said top and bottom sections, said top section of said transmission line being coupled to said cooking cavity adjacent to the upper portion thereof at the rear thereof and generally centrally laterally thereof, the bottom section of said transmission line being disposed laterally toward one side of said bottom apparatus compartment, and the rear section of said transmission line interconnecting said top and bottom sections within said rear apparatus compartment.

7. The electronic heating apparatus set forth in claim 4, and further comprising a filter disposed in the path of the air stream in advance of the impingement thereof upon said generator.

8. An electronic heating apparatus comprising an upstanding box-like metal casing, a box-like metal liner disposed in the upper portion of said casing and defining a cooking cavity, insulating structure disposed in said casing and surrounding the outer walls of said liner to provide temperature insulation therefor and cooperating with said casing to define a rear apparatus compartment behind said liner, a drawer disposed in said casing below said liner and spaced from said insulating structure and extending across said casing a bottom apparatus compartment disposed below said drawer, a resistive heating element disposed within said liner for heating said liner and material disposed within said cooking cavity to temperatures in the normal cooking range to carry out cooking therein and also to temperatures well above the normal cooking range to carry out heat cleaning of the interior of the liner, a generator disposed in said bottom apparatus compartment for supplying ultra-high frequency electromagnetic wave energy, and a transmission line interconnecting said generator and said cooking cavity and extending through said bottom apparatus compartment and said rear apparatus compartment, said drawer being interposed between said liner and said generator and providing a thermal shield therebetween.

9. The electronic heating apparatus set forth in claim 8, wherein said transmission line extends from said liner through said insulating structure and into said rear apparatus compartment.

10. The electronic heating apparatus set forth in claim 8, and further comprising means for forcing a stream of air into said casing and through said bottom apparatus compartment and said generator and out of said casing to effect cooling of said generator, said insulating structure serving to insulate said liner from said air stream to render the temperature distribution within said cooking cavity more uniform.

11. An electronic heating apparatus comprising an upstanding box-like metal case, a box-like metal liner disposed in the upper portion of said casing and defining a cooking cavity and cooperating with said casing to define a rear apparatus compartment behind said liner, a drawer mounted in said casing below said liner and spaced therefrom and extending across said casing, a bottom apparatus compartment disposed below said drawer, a generator disposed in said bottom apparatus compartment for supplying ultra-high frequency electromagnetic wave energy, said generator including a crossed-field discharge device having an annular outer output terminal and an inner output terminal both arranged with the longitudinal axes thereof disposed substantially horizontally and extending toward the rear of said casing, and a coaxial transmission line interconnecting said device and said cooking cavity and extending through said bottom apparatus compartment and said rear apparatus compartment, said drawer being interposed between said liner and said generator and providing a thermal shield therebetween, said transmission line including an outer conductor having one end connecetd to said outer output terminal and having the other end connected to said liner and an inner conductor having one end connected to said inner output terminal and having the other end coupled to said cooking cavity.

12. The electronic heating apparatus set forth in claim 11, wherein said outer conductor telescopically overlaps said outer output terminal and is readily disconnectable therefrom, and said inner conductor telescopically overlaps said inner output terminal and is readily disconnectable therefrom.

13. The electronic heating apparatus set forth in claim 11, wherein said other end of said transmission line is readily disconnectable from said liner and the other end of said inner conductor is readily removable from said cooking cavity.

14. An electronic heating apparatus comprising an upstanding box-like metal casing, a box-like metal liner disposed in the upper portion of said casing and defining a cooking cavity and cooperating with said casing to define a rear apparatus compartment behind said liner, a drawer mounted in said casing below said liner and spaced therefrom and extending across said casing and cooperating therewith to define a bottom apparatus compartment below said drawer, a generator disposed in said bottom apparatus compartment for supplying ultra-high frequency electromagnetic wave energy, said generator including a crossed-field discharge device having an annular outer output terminal and an inner output terminal both arranged with the longitudinal axes thereof disposed substantially horizontally and extending toward the rear of said casing, said inner output terminal having applied thereto the heater potential and the B− potential and the RF output potential and said outer output terminal having the B+ potential and the RF output potential applied thereto, and a coaxial transmission line interconnecting said device and said cooking cavity and extending through said bottom apparatus compartment and said rear apparatus compartment, said transmission line including an outer conductor having one end connected to said outer output terminal and having the other end connected to said liner and an inner conductor having one end connected to said inner output terminal and having the other end coupled to said cooking cavity and a combination filter and tuning structure, said combination filter and tuning structure suppressing leakage of the RF output potential and harmonics thereof into the B+ and heater power supplies and serving as a tuning reactance for matching the impedance of said generator to the load in said cooking cavity.

15. An electronic heating apparatus comprising an upstanding box-like metal casing, a box-like metal liner disposed in the upper portion of said casing and defining a cooking cavity and cooperating with said casing to define a rear apparatus compartment behind said liner, a drawer mounted in said casing below said liner and spaced therefrom and extending across said casing, a bottom apparatus compartment disposed below said drawer, a generator for supplying ultra-high frequency electromagnetic wave energy and including an enclosed metal housing having therein a crossed-field electron discharge device and a power supply therefor, said housing being disposed in said bottom apparatus compartment and being readily detachable and removable therefrom, and a transmission line interconnecting said generator and said cooking cavity and extending through said bottom apparatus compartment and said rear apparatus compratment, said drawer being interposed between said liner and said generator and providing a thermal shield therebetween.

16. An electronic heating apparatus comprising an upstanding box-like metal casing, a box-like metal liner disposed in the upper portion of said casing and defining a cooking cavity and cooperating with said casing to define a rear apparatus compartment behind said liner, a drawer mounted in said casing below said liner and spaced therefrom and extending across said casing and cooperating therewith to define a bottom apparatus compartment below said drawer, a generator for supplying ultra-high frequency electromagnetic wave energy and including an enclosed metal housing having therein a crossed-field electron discharge device and a power supply therefor, said power supply being a voltage doubler and rectifier circuit, said housing being disposed in said bottom apparatus compartment and being readily detachable and removable therefrom and is grounded on said casing and is electrically insulated from said electron discharge device and said voltage doubler and rectifier circuit, and a transmission line interconnecting said generator and said cooking cavity and extending through said bottom apparatus compartment and said rear apparatus compartment.

17. The electronic heating apparatus set forth in claim 16, and further comprising an inner metallic enclosure disposed within said housing and electrically insulated therefrom and having positioned therein said electron discharge device.

18. In an electronic heating apparatus, a generator for supplying ultra-high frequency electromagnetic wave energy to the electronic heating apparatus, said generator comprising a first metal housing readily mountable in and detachable from the associated electronic heating apparatus, a second metal housing mounted in said first metal housing and electrically insulated therefrom, a crossed-field electron discharge device mounted in said second housing, and a voltage doubler and rectifier circuit for said device mounted in said first housing and electrically insulated therefrom.

19. The generator set forth in claim 18, and further comprising a first reticulated wall in said first metal housing on one side of said discharge device for admitting a stream of air therethrough, a second reticulated wall in said first metal housing on the other side of said generator for passing a stream of air therethough, and a fan mounted between said first reticulated wall and said discharge device for drawing the stream of air through said first reticulated wall and passing the stream of air over said discharge device and discharging the stream of air through said second reticulated wall.

20. The generator set forth in claim 19, and further comprising a filter disposed in the path of the air stream in advance of the impingement thereof on said discharge device.

References Cited

UNITED STATES PATENTS

| 3,121,158 | 2/1964 | Hurko | 219—397 |
| 3,172,987 | 3/1965 | Fitzmayer | 219—10.55 |
| 3,377,562 | 4/1968 | Staats | 219—10.55 X |
| 3,388,231 | 6/1968 | Staats | 219—10.55 |

FOREIGN PATENTS 1,249,130  11/1960  France.

JOSEPH V. TRUHE, Primary Examiner

L. H. BENDER, Assistant Examiner